United States Patent
Pherson et al.

(10) Patent No.: US 7,849,261 B2
(45) Date of Patent: Dec. 7, 2010

(54) TEMPERATURE CONTROL TO REDUCE CASCADE FAILURES IN A MULTI-DEVICE ARRAY

(75) Inventors: James Edwin Pherson, Colorado Springs, CO (US); Timothy E. Arnson, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 65 days.

(21) Appl. No.: 11/478,027

(22) Filed: Jun. 29, 2006

(65) Prior Publication Data

US 2008/0005469 A1    Jan. 3, 2008

(51) Int. Cl.
G06F 13/00 (2006.01)
G06F 13/28 (2006.01)

(52) U.S. Cl. ........................ 711/114; 711/111
(58) Field of Classification Search .......... None
See application file for complete search history.

(56) References Cited

U.S. PATENT DOCUMENTS

| | | | |
|---|---|---|---|
| 5,587,685 A | 12/1996 | Johansson | |
| 5,666,538 A | 9/1997 | DeNicola | |
| 5,961,613 A | 10/1999 | DeNicola | |
| 6,076,142 A * | 6/2000 | Corrington et al. | 711/114 |
| 7,035,972 B2 | 4/2006 | Guha et al. | |
| 7,146,521 B1 * | 12/2006 | Nguyen | 714/2 |
| 2002/0188711 A1 | 12/2002 | Meyer et al. | |
| 2003/0031187 A1 | 2/2003 | Heffernan et al. | |

* cited by examiner

*Primary Examiner*—Reginald G Bragdon
*Assistant Examiner*—Eric S Cardwell
(74) *Attorney, Agent, or Firm*—Fellers, Snider, et al.

(57) ABSTRACT

Method and apparatus for reducing a likelihood of a cascade failure in a multi-device array. The array preferably comprises a controller and a plurality of storage devices to define a memory space across which data are stored in accordance with a selected RAID configuration. The controller operates to sever an operational connection between the storage devices and a host device in relation to a detected temperature of at least one storage device of the array. Preferably, when a selected device reaches a first threshold temperature level, the controller arms for a potential shutdown. When a selected device reaches a second higher threshold temperature, the controller preferably powers down all of the devices and executes a self-reboot operation. The controller preferably monitors a temperature of the array while the devices remain powered down, after which the storage devices are powered up and data reconstruction operations take place as required.

19 Claims, 6 Drawing Sheets

TEMPERATURE CONTROL TO REDUCE CASCADE FAILURES IN A MULTI-DEVICE ARRAY

FIELD OF THE INVENTION

The claimed invention relates generally to the field of data storage systems and more particularly, but not by way of limitation, to a method and apparatus for reducing cascade failures in a multi-device array.

BACKGROUND

Storage devices are used to access data in a fast and efficient manner. Some types of storage devices use rotatable storage media, along with one or more data transducers that write data to and subsequently read data from tracks defined on the media surfaces.

Multi-device arrays (MDAs) can employ multiple storage devices to form a consolidated memory space. One commonly employed format for an MDA utilizes a RAID (redundant array of independent discs) configuration, wherein input data are stored across multiple storage devices in the array. Depending on the RAID level, various techniques including mirroring, striping and parity code generation can be employed to enhance the integrity of the stored data.

With continued demands for ever increased levels of storage capacity and performance, there remains an ongoing need for improvements in the manner in which storage devices in such arrays are operationally managed. It is to these and other improvements that preferred embodiments of the present invention are generally directed.

SUMMARY OF THE INVENTION

Preferred embodiments of the present invention are generally directed to an apparatus and method for reducing a likelihood of a cascade failure in a multi-device array.

The array preferably comprises a controller, and a plurality of storage devices which define a memory space across which data are stored in accordance with a selected RAID configuration. The controller operates to sever an operational connection between the storage devices and a host device in relation to a detected temperature of at least one storage device of the array.

In accordance with preferred embodiments, when a selected storage device reaches a first threshold temperature level, the controller arms for a potential shut-down if additional storage devices are found to be operating at or near the first threshold temperature level. When a selected storage device reaches a second, higher threshold temperature, the controller preferably powers down all of the storage devices, thus severing the connection between the devices and the host. Preferably, the controller further executes a controller self-reboot operation.

Upon reinitialization, the controller preferably monitors a temperature of the array while the storage devices remain in a powered down state. When a safe operating temperature threshold level is reached, the storage devices are powered up and data reconstruction operations take place as required.

In this way, the additional background workload processing required to replicate a failed device due to overtemperature preferably does not induce additional overtemperature failures in devices operating near the temperature shut-down threshold level.

The severing of the operational connection is preferably interpreted by the host device as a connectivity failure, rather than as an array failure. Thus, the host device is less likely to execute significant data transfers with the array to pull off data prior to array failure, thereby potentially hastening the cascade failure event.

These and various other features and advantages which characterize the claimed invention will become apparent upon reading the following detailed description and upon reviewing the associated drawings.

DETAILED DESCRIPTION

Figure 1:
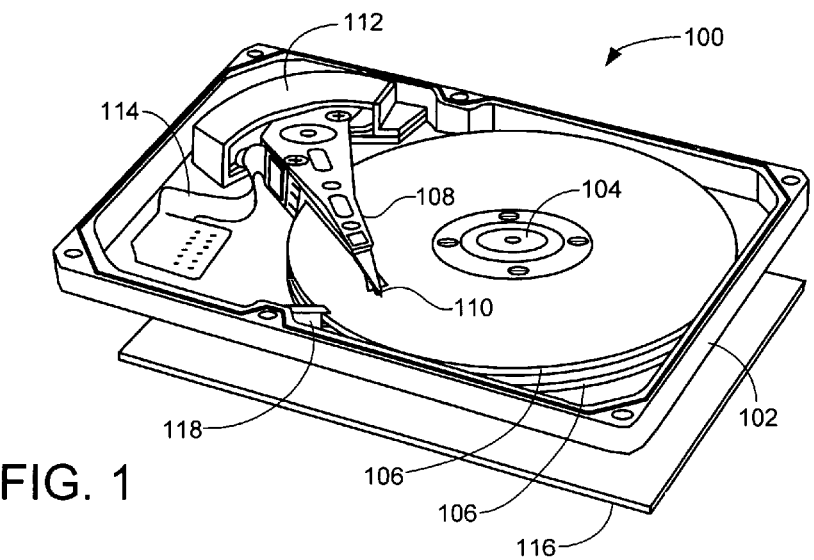
FIG. 1 generally illustrates a storage device constructed and operated in accordance with preferred embodiments of the present invention.

FIG. 1 shows an exemplary storage device 100 configured to store and retrieve user data. The device 100 is preferably characterized as a hard disc drive, although other device configurations can be readily employed as desired.

A base deck 102 mates with a top cover (not shown) to form an enclosed housing. A spindle motor 104 is mounted within the housing to controllably rotate media 106, preferably characterized as magnetic recording discs.

A controllably moveable actuator 108 moves an array of read/write transducers 110 adjacent tracks defined on the media surfaces through application of current to a voice coil motor (VCM) 112.

A flex circuit assembly 114 provides electrical communication paths between the actuator 108 and device control electronics on an externally mounted printed circuit board (PCB) 116. The transducers 110 are preferably parked in a safe parked position on a load/unload ramp structure 118 when the device 100 is deactivated.

Figure 2:
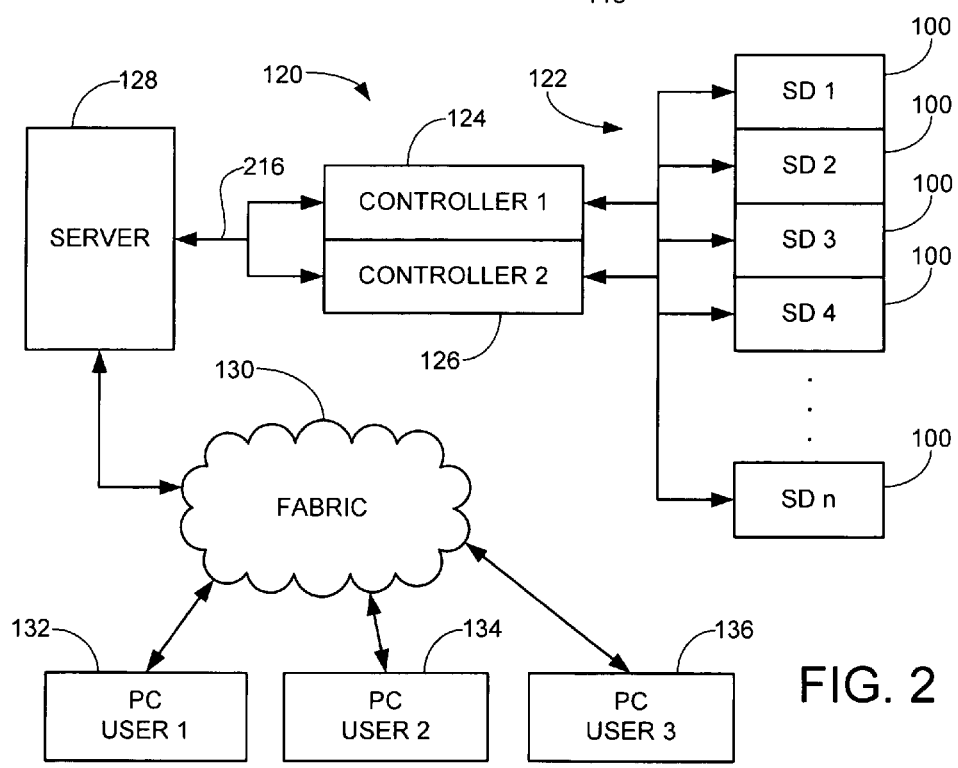
FIG. 2 is a functional block diagram of a network system which utilizes a number of storage devices such as illustrated in FIG. 1.

FIG. 2 generally illustrates an exemplary network system 120 that advantageously incorporates a number n of the storage devices (SD) 100 to form a consolidated storage space 122. Redundant controllers 124, 126 preferably operate to transfer data between the storage space 122 and a server 128. The server 128 in turn is connected to a fabric 130, such as a local area network (LAN), the Internet, etc.

Remote users respectively access the fabric 130 via personal computers (PCs) 132, 134, 136. In this way, a selected user can access the storage space 122 to write or retrieve data as desired.

The devices 100 and the controllers 124, 126 are preferably incorporated into a multi-device array (MDA). The MDA preferably uses one or more selected RAID (redundant array of independent discs) configurations to store data across the devices 100. Although only one MDA and three remote users are illustrated in FIG. 2, it will be appreciated that this is merely for purposes of illustration and is not limiting; as desired, the network system 120 can utilize any number and types of MDAs, servers, client and host devices, fabric configurations and protocols, etc.

Figure 3:
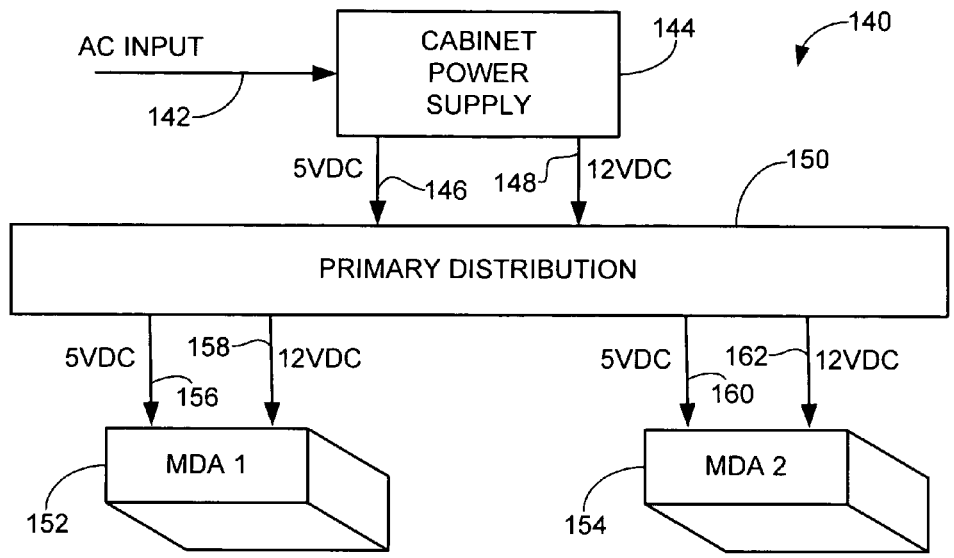
FIG. 3 illustrates a power distribution system for selected portions of the network system of FIG. 2.

FIG. 3 shows a preferred configuration for a power distribution system 140 used to supply input power and control for a number of MDAs such as shown in FIG. 2. While not limiting, it is contemplated that the system 140 is integrated into a cabinet, rack, or other suitable housing arrangement.

Input alternating current (AC) power is supplied via path 142 to a cabinet power supply 144. The input power is at a suitable line voltage, such as 240 VAC. The power supply 144 applies rectification and other signal conditioning to output direct current (dc) power, such as at nominally +5 VDC and +12 VDC as shown on respective paths 146, 148.

The use of +5 and +12 voltage levels is merely for purposes of illustrating a preferred embodiment and is not limiting. Thus, other numbers of outputs and other specific voltage levels can be employed as desired. The respective voltages are preferably expressed with respect to a common reference line, such as electrical ground.

The output power on paths 146, 148 is supplied to a primary distribution module 150. The module 150 is preferably characterized as a backplane configured to support electrical and mechanical interconnection of the power supply 144, as well as a number of MDAs such as the two MDAs shown respectively at 152 and 154. The respective MDAs 152, 154 are preferably modular and configured to "plug" into the primary distribution module 150 via a suitable connector arrangement. This allows the MDAs to be installed, removed and replaced as required.

The primary distribution module 150 performs signal conditioning and regulation upon the input power supplied thereto via paths 146, 148, and provides corresponding +5VDC and +12VDC outputs on respective paths 156, 158 and 160, 162.

Figure 4:
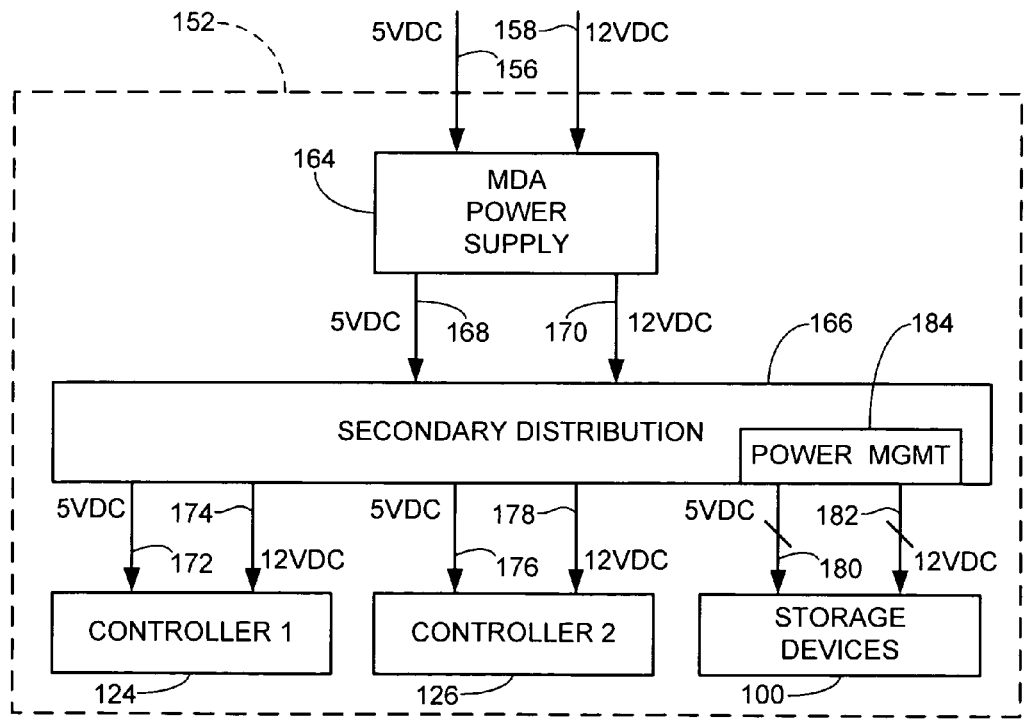
FIG. 4 shows a selected multi-device array (MDA) of FIG. 3.

FIG. 4 provides a generalized functional block diagram of a selected MDA from FIG. 3, in this case MDA 152. The input power from paths 156, 158 is provided to an MDA power supply 164. The power supply 164 applies signal conditioning and regulation on the input power, and outputs corresponding +5 and +12 source voltages to a secondary distribution module 166 via paths 168, 170.

The module 166 is preferably configured as an internal MDA backplane to facilitate electrical and mechanical interconnections of the various components of the MDA 152, including the aforementioned controllers 124, 126 and devices 100. Power is respectively supplied to these components as shown via path sets 172 and 174; 176 and 178; and 180 and 182. The MDA 152 in the present example is contemplated as accommodating a total of 10 storage devices 100 (e.g., n=10 from FIG. 2). Thus, it will be understood that the path sets 180 and 182 preferably constitute individual, separate pathways to each device 100 for each input power level.

The secondary distribution module 166 is shown in FIG. 4 to include a power management (POWER MGMT) block 184. The power management block 184 is preferably configured to alter the input power state of each data storage device 100 as required; that is, the power management block 184 selectively connects or disconnects the respective +5 and +12 input power levels to each of the storage devices 100 to power up or power down the devices, respectively. The power management block 184 preferably operates in response to control inputs supplied by a selected one of the controllers 124, 126.

Figure 5:
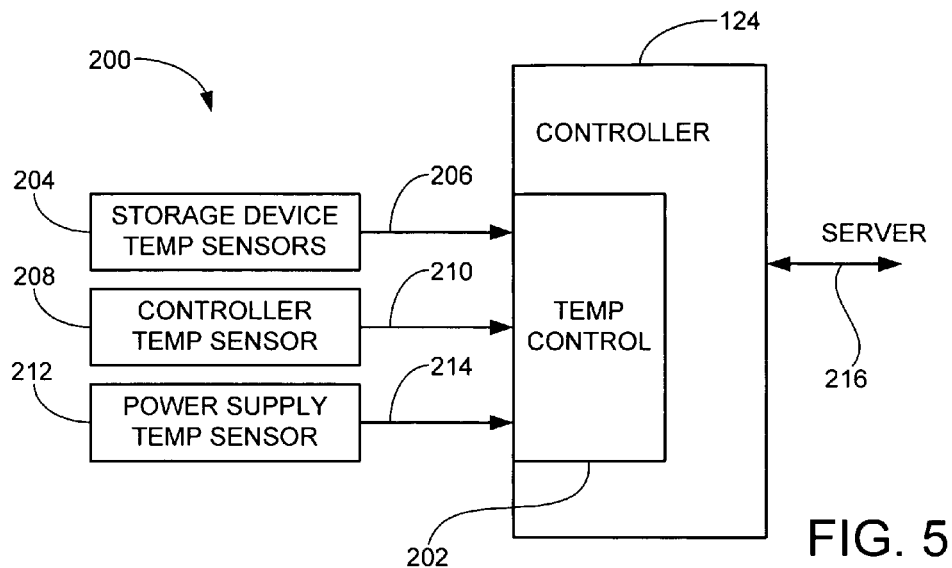
FIG. 5 generally illustrates a temperature control system of the MDA.

FIG. 5 generally illustrates a temperature control system 200 of a selected MDA, such as 152. A selected controller, such as 124, includes a temperature control module 202 which preferably polls or otherwise receives inputs from an array of storage device temperature sensors 204 on path 206. Each storage device temperature sensor 204 is preferably disposed within the associated storage device 100, such as within the enclosed housing or mounted to the associated device PCB 116.

The module 202 further preferably receives inputs from one or more controller temperature sensors 208 mounted on or proximate the controller 124 via path 210. Inputs from one or more power supply temperature sensors 212 on or proximate the MDA power supply 164 are further supplied via path 214. The sensed temperature values on paths 206, 210 and 214 preferably comprise multi-bit digital values indicative of a detected temperature by the associated sensor 204, 208, 212.

It is contemplated that these values can be transmitted to the temperature control module 202 in real time during operational monitoring, although in alternative embodiments temperature values are transmitted only after the detection of an anomalous temperature condition by the local device.

An operational connection between the controller 124 and the server 128 is shown at 216. This operational connection is used for normal data and command transfers, and can comprise one or more multi-line busses or other communication pathways. As desired, the controller 124 can communicate the temperature values, or information regarding the same, to the server 128 via this operational connection 216. Since the controller 124 is shown to be interposed between the server 128 and the storage devices 100, it will be appreciated that the operational connection 216 comprises an exemplary operational connection between the server 128 and the storage devices 100.

During normal operation, the storage devices 100 are each preferably configured to self-monitor its own operational temperature and to execute a self-shutdown operation when the operational temperature reaches a selected temperature threshold (such as, e.g., 65 degrees C.). This is graphical represented in FIG. 6, which provides an exemplary temperature profile 220 for the 10 storage devices (1-10) plotted against a storage device x-axis 222 and a temperature y-axis 224.

Figure 6:
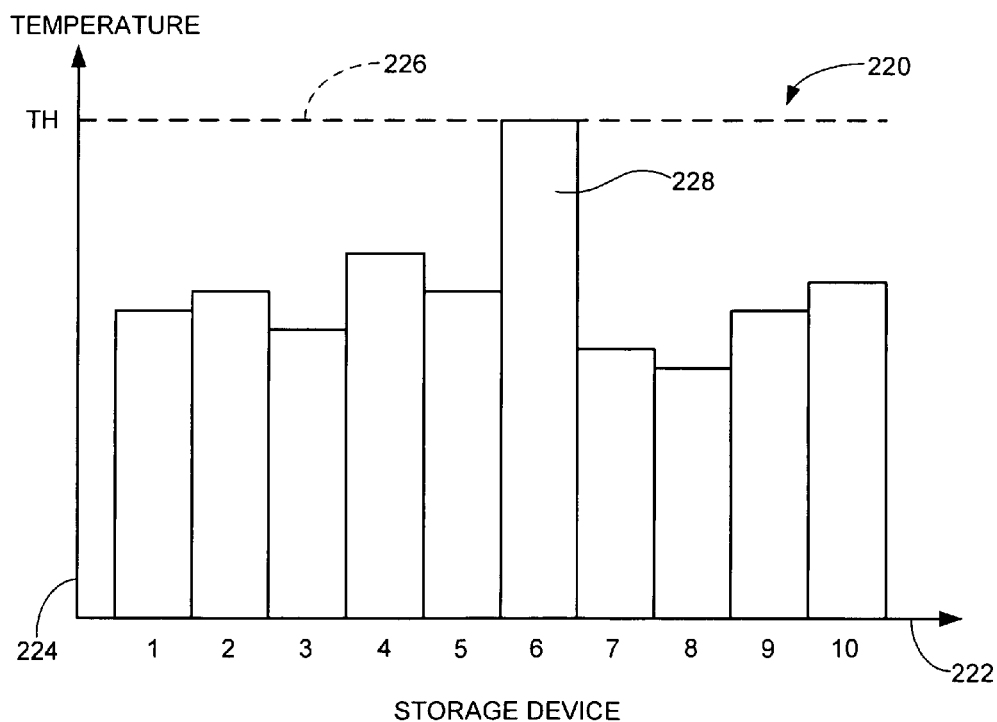
FIG. 6 graphically represents an exemplary temperature profile for the storage devices of the MDA during operation.

The shutdown temperature threshold TH is denoted by broken line 226. In FIG. 6, storage device number 6 (SD(6)) is shown by temperature bar 228 to have reached the threshold TH, and hence will perform a self-shutdown to prevent a likelihood of damage or data loss due to operation at such a high temperature. The device shut-down sequence will preferably include a status notification to the controller 124, a parking of the transducers 110 on ramp structure 118, a spinning down of the spindle motor 104, and a deactivation of the various control electronics on the device PCB 116.

While such self-shutdown capabilities have been found operable, a problem arises when the shutting down of a single device such as SD(6) results in a cascade failure of the array. For example, when data are stored across the devices in a RAID configuration, removing a single device often results in a vigorous data reconstruction operation whereby the data from the powered down device are reconstructed and placed on a new device.

The use of data striping, redundancies (mirroring) and parity typically allow the array to continue data transfer operations with the remaining devices. However, depending on the data load, the MDA will operate at a relatively high operational load in the background for an extended period of time to reconstruct the data that was on the lost device and configure a new device (such as a spare) to take its place. This ongoing data reconstruction can take an extended period of time, such as on the order of several hours.

It follows that the loss of a single device may significantly increase the operating levels of a number of other devices in the array, which can further increase the amount of heat generated by the array. If additional devices are operating near the shutdown temperature threshold, this additional reconstruction activity may be sufficient to cause one or more additional devices to fail (i.e., shut-down due to an overtemperature condition).

The failure of a second device 100 in the array due to overtemperature will further increase the reconstruction activity loading, as the array will now operate in an attempt to reconstruct the second failed device. Thus, even if the array has multiple levels of redundancy built in so that a number of failed devices can theoretically be tolerated, each device failure may induce additional failures in turn. At some point there may be an insufficient number of remaining active devices to continue operation, at which point the controller will shut down the array from access by the server 128.

Such cascaded failures can sometimes be further exasperated by operations taken at the host server level. When the controller notifies the server 128 of device failures, the host can further increase the operational loading on the array by attempting to access and cache large amounts of data before the array shuts down. Hence, such host intervention can contribute to the ultimate loss of array availability.

Figure 7:
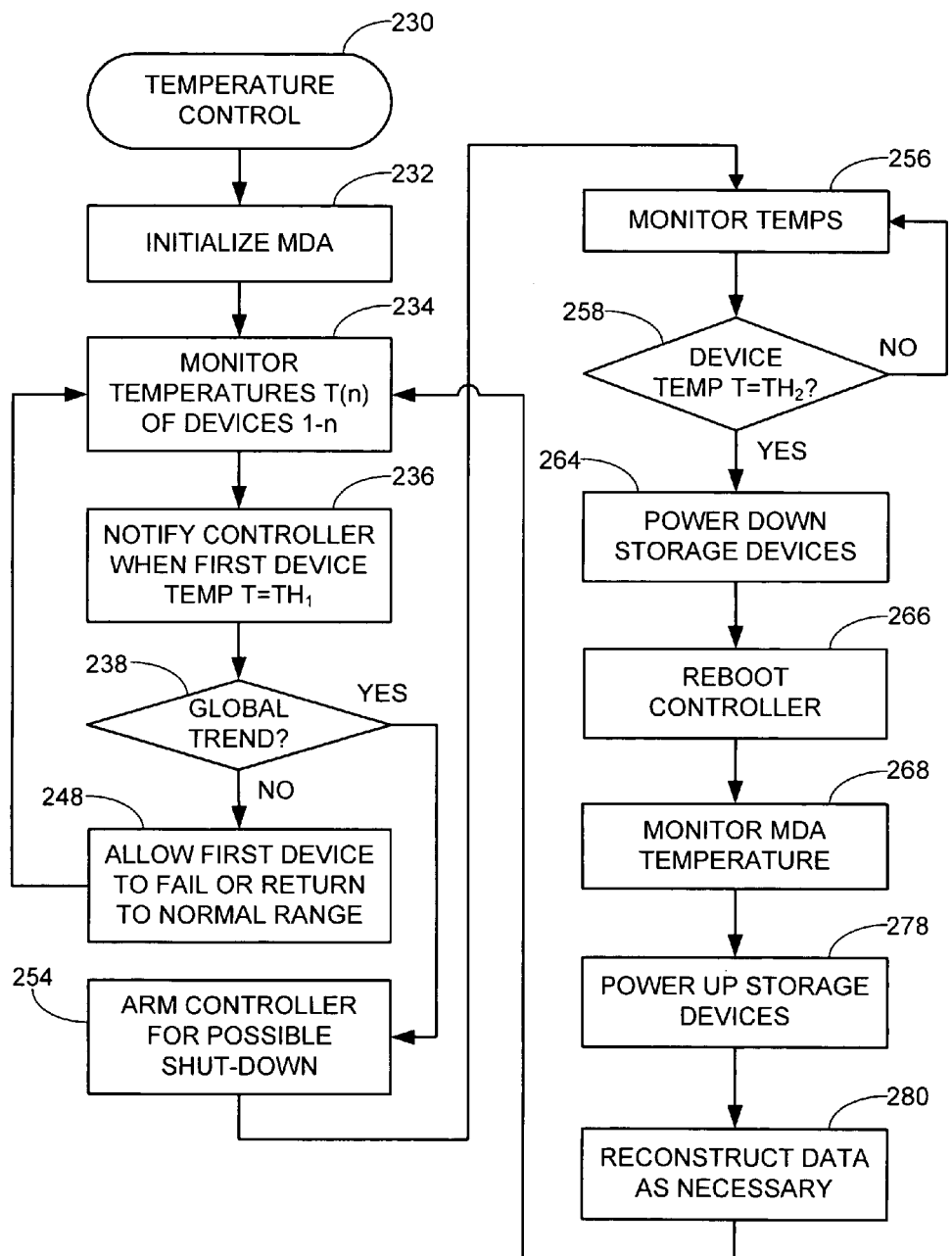
FIG. 7 is a flow chart for a TEMPERATURE CONTROL routine, illustrative of steps carried out in accordance with preferred embodiments to control the MDA of FIG. 4.

Accordingly, FIG. 7 sets forth a flow chart for a TEMPERATURE CONTROL routine 230, generally representative of steps carried out in accordance with preferred embodiments by each of the MDAs of the system, such as MDA 152, to reduce a likelihood of cascade failure.

At step 232, the selected MDA is initialized and brought on-line for normal operation. As discussed above, this can include the provision of the requisite dc input power to the secondary distribution module 166, the initialization of the respective controllers 124, 126, and the sequential application of dc power to the storage devices 100.

Operational temperatures are next monitored at step 234 during normal data transfer operations with the MDA 152. Such temperature monitoring can take place in a number of ways. In a preferred embodiment, the devices 100 self-monitor so that during this step the controller 124 does not see the normal range temperature values during this step. Alternatively, all temperature values from all sensors (e.g., 204, 208, 212) can be fed and continuously monitored by the temperature control block 202.

The controller 124 is notified at step 236 when a selected one of the storage devices 100 first attains a detected temperature value that reaches a first threshold $TH_1$. Preferably, the $TH_1$ threshold value is selected to be lower than the normal shutdown temperature threshold, referred to herein as $TH_2$. Exemplary values for $TH_1$ and $TH_2$ may be 60 degrees C. and 65 degrees C., respectively, although other values can readily be used as desired. This notification preferably takes place via path 206 in FIG. 5.

Figure 8:
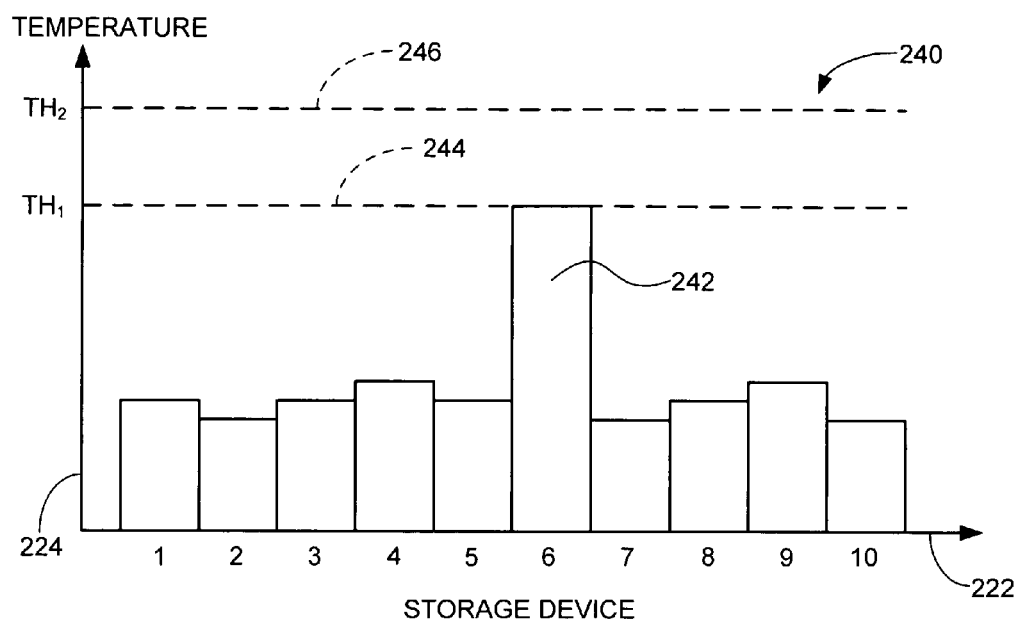
FIGS. 8 and 9 provide respective graphical representations of different exemplary temperature profiles during operation in which a selected storage device has reached a first threshold level.
Figure 9:
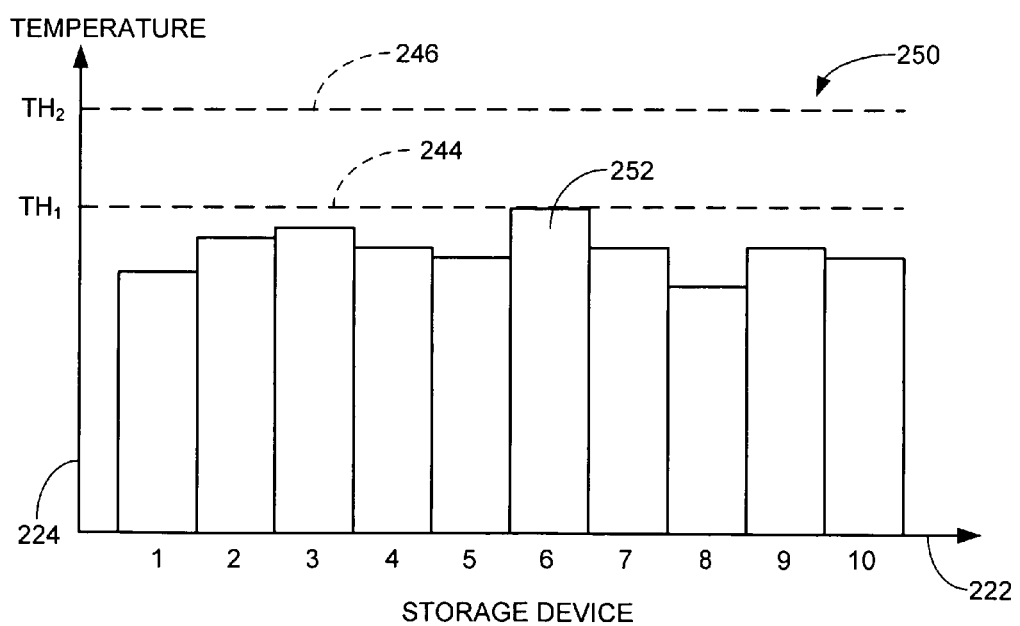

Once the first threshold value $TH_1$ is reached by at least one storage device 100, the controller 124 preferably operates to assess an overall temperature profile for all of the devices 100, as shown by decision step 238. In a preferred embodiment, this is carried out by the temperature control module 202 requesting current temperature values from each of the devices 100 in the MDA. FIGS. 8 and 9 provide alternative, exemplary profiles that may be obtained as a result of this step.

In FIG. 8, a profile 240 is obtained in which the temperature excursion of a single device, in this case SD(6), is substantially isolated as compared to the remaining devices in the array. More specifically, temperature bar 242 is shown to have reached the first threshold $TH_1$ (broken line 244), while the remaining temperatures are relatively lower than the first threshold. For reference, the second, higher threshold $TH_2$ is represented by broken line 246.

In such case, the elevated temperature condition of SD(6) initially appears to be substantially isolated to that particular device. The cause for this discrepancy in temperature value may be unknown at this time, but it is generally likely that the temperature value is a result of a failed or soon-to-be-failed component of the SD(6) device 100, particularly if the operational load is evenly distributed across the respective devices (i.e., SD(6) is not the only device performing I/O operations at the time).

However, such is not always necessarily the case; that is, the higher operational temperature of SD(6) may not be related to an imminent component failure. It has been found, for example, that storage devices such as SD(6) can undergo a temporary "heating" cycle during which temperature is elevated for a short time, after which the device returns to exhibit more normal operation with no long term detrimental effects.

As a result, the exemplary profile 240 in FIG. 8 would generally not be viewed as constituting a global trend, but rather would be deemed as substantially isolated to a single device. In such case, the flow of FIG. 7 continues to step 248 wherein the device is monitored, but allowed to continue operation within the array.

Generally, the device with the elevated operational temperature (e.g., SD(6)) will either reach the second threshold level $TH_2$, in which case the device will shut itself down, or until the device will ultimately return to the normal operational range below the first threshold level $TH_1$.

It will be noted that should the device shut-down due to overtemperature, the controller 124 will preferably initiate a data reconstruction operation in the background to operationally replace the failed device within the array. However, there will generally be a reduced likelihood that data reconstruction workload will induce a cascade failure of the MDA 152 since the remaining devices 100 exhibit normal operational temperature levels.

By contrast, FIG. 9 provides a different temperature profile 250. In FIG. 9, storage device SD(6) has reached the first threshold level $TH_1$ (as indicated by bar 252), and several of the remaining devices 100 are near this first threshold level as well. While the cause of this temperature excursion may be unknown, it is likely that the profile is a result of ambient effects affecting the array in a more or less global manner, as opposed to being limited to a single device.

Thus, the routine of FIG. 7 passes from decision step 238 to step 254 wherein the controller 124 is armed for a possible shut-down operation in the near future. For reference, since in the present example both controllers 124, 126 are operated in tandem, both controllers are preferably armed at this time.

The flow continues to step 256 wherein the temperatures of the storage devices 100 are preferably continuously monitored by the associated controller 124. As shown by decision step 258, such monitoring preferably continues to see if the temperature of at least one device will reach the second, higher threshold level $TH_2$.

If a "cooling trend" occurs during the monitoring step 256 so that all of the temperatures fall down below the first threshold level $TH_1$, the controllers are preferably disarmed; that is, step 254 is reversed and the routine passes back to step 234.

Figure 10:
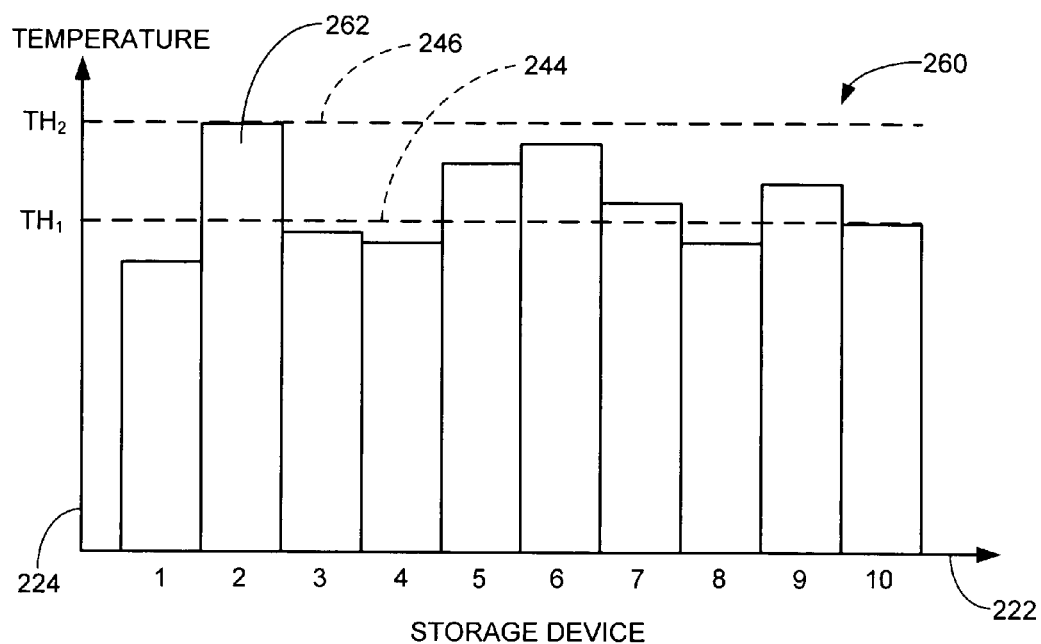
FIG. 10 provides another graphical representation of an exemplary temperature profile during operation in which a selected storage device has reached a second threshold level.

FIG. 10 shows an exemplary temperature profile 260 obtained during step 256 of FIG. 7. In FIG. 10, a selected storage device, in this case device SD(2), has reached the second threshold level $TH_2$ as indicated by temperature bar 262. By this it can be seen that the first device to reach the first threshold $TH_1$ may or may not be the first device to reach the second threshold $TH_2$. At the point that SD(2) reaches $TH_2$, several (but not all) of the remaining devices are shown in FIG. 10 to have elevated temperatures between $TH_1$ and $TH_2$.

As before, SD(2) preferably initiates a self-shutdown operation to remove itself from the array once the second threshold TH2 is reached. Additionally, the controller 124 will preferably operate at step 264 in FIG. 7 to shut down all of the remaining devices in the array as well. This is preferably carried out using the power management module 184 of FIG. 4.

At step 266, the controller 124 preferably executes a reboot operation to sever the operational connection 216 with the server 128. In a dual controller arrangement such as exemplified herein, preferably both controllers 124, 126 carry out this operation in tandem. The controller 124 preferably carries this out in accordance with associated operational routine programming steps stored in memory.

An advantage a controller reboot operation is that the server 128 will generally observe a loss of connection between itself and the MDA 152, and will likely interpret this as a connectivity failure rather than as an array failure. Hence, the server 128 will not tend to immediately initiate any server-level data reconstruction efforts, but instead will either move to a redundant system for its data needs (if such is available), or wait until the connection is restored.

The controller reboot operation preferably powers down the controller(s), followed immediately by a power up and self-initialization operation. As desired, the controller 124 may delay reporting its own availability to the server upon reinitialization, so that the controller 124 remains active but off-line. Thus, depending on the configuration of the system, the controller may alternatively sever the operational connection with the host to take itself off-line without the need for a reboot.

While the storage devices 100 remain powered down, the controller 124 preferably continues at step 268 to monitor one or more temperatures of the MDA. This is graphically represented in FIG. 11 by MDA temperature curve 270, plotted against elapsed time x-axis 272 and temperature magnitude y-axis 274. The monitoring of the MDA temperature can take place in a number of ways, such as via the controller temperature sensor(s) 208 and/or the power supply temperature sensor(s) 212. A composite temperature value can be determined in relation to these values as well, as desired.

Figure 11:
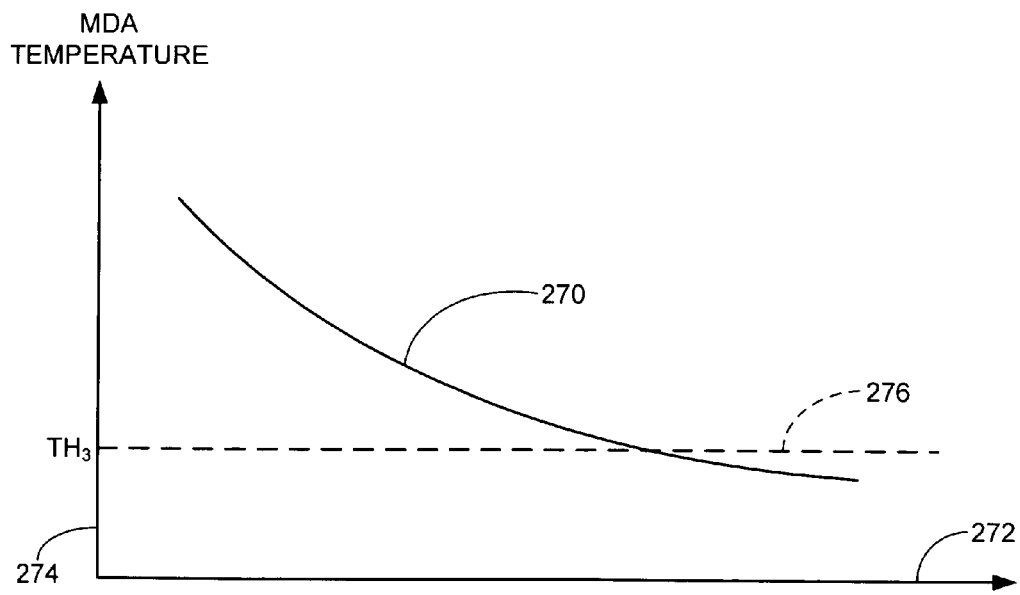
FIG. 11 provides a graphical representation of detected MDA temperature while the storage devices are in a power down condition in accordance with the routine of FIG. 7.

It is contemplated that upon the power down of the devices 100 at step 264, the determined MDA temperature will decrease over time, such as indicated by FIG. 11. Preferably, the MDA temperature is continued to be monitored until the temperature reaches a third, lower threshold $TH_3$ (such as, e.g., 55 degrees C.), such as indicated by broken line 276. In some preferred embodiments, the controller 142 is configured to carry out selected evaluation tests upon the originally shut-down device in an attempt to better assess the viability of retaining the device 100 in an operational state.

The time for the MDA temperature to reach the third threshold TH3 will depend on a number of factors. Preferably, the MDA 152 is equipped with a forced air, convective cooling system so that the delay during which the temperature drops is not unduly long.

Once the $TH_3$ threshold level is reached, the flow of FIG. 7 preferably continues to step 278 where all of the devices 100 are powered up and again brought on-line. If the operational connection with the server 128 has not already been reestablished, the controller 124 preferably reestablishes this connection at this point.

Step 280 sets forth an optional data reconstruction operation which is next carried out as required by the MDA 152. At least in some cases it is contemplated that after the "cooling off" operation of steps 264, 266, 268 and 278, the triggering device 100 (in this case, SD(2)) will be able to be returned to service without the need to undergo reconstruction of the data. Nevertheless, if reconstruction operations are to commence, such will generally take place under circumstances less likely to induce a cascade failure. The routine then returns to step 234 as shown.

For purposes of the appended claims, the phrase "severing an operational connection" will be understood consistent with the foregoing discussion to describe the disconnection of an operational link between the host and the storage devices in such a manner that the host interprets the storage devices as being off-line or otherwise unavailable for I/O operations. While this is preferably carried out by the powering down of the devices and/or by the rebooting of the controller, such is not necessarily limiting.

While preferred embodiments presented herein have been directed to a multi-device array utilizing a plurality of disc drive storage devices, it will be appreciated that such is merely for purposes of illustration and is not limiting. Rather, the claimed invention can be utilized in any number of various environments to promote data integrity.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. A method comprising monitoring a temperature of a multi-device array and, responsive to a selected storage device of said array reaching a predetermined first temperature threshold, powering down a the selected storage device, and severing an operational connection between the array and a host device in relation to a trend of elevated temperatures in the remaining storage devices of the array detected when the selected device previously reached a lower predetermined second temperature threshold, else maintaining said operational connection in an absence of said trend.

2. The method of claim 1, wherein the severing step comprises powering down the remaining storage devices.

3. The method of claim 1, wherein the severing step comprises continuously maintaining each of the remaining storage devices in an operational condition while executing a reboot operation upon a controller interposed between the array and the host device to sever and restore the operational connection.

4. The method of claim 1, further comprising a step of arming a controller coupled to the storage devices of the multi-device array for a potential power down operation when the trend of elevated temperatures is detected while the temperature of the selected storage device is at the second temperature threshold, wherein the severing step is carried out when the controller is armed, and wherein the maintaining step is carried out when the controller is not armed.

5. The method of claim 1, further comprising a prior step of using a controller to request temperature values from each of the remaining storage devices when the selected device reaches the second temperature threshold and to use said temperature values to determine whether said trend is present or absent.

6. The method of claim 3, wherein the host device interprets the severing of the operational connection as a connectivity failure with the controller.

7. The method of claim 1, further comprising steps of reestablishing the operational connection between the controller and the host device, and powering up the selected device.

8. An apparatus comprising a multi-device array comprising a controller and a plurality of storage devices, the controller configured to sever an operational connection between the plurality of storage devices and a host device responsive to a selected storage device of said plurality reaching a first temperature threshold level, wherein the controller arms itself for said severing of the operational connection when a temperature profile of the remaining devices in said plurality of storage devices demonstrates a trend of elevated temperatures while the selected storage device is at a lower, second temperature threshold level, and wherein the controller does not arm itself for said severing of the operational connection if the temperature profile does not demonstrate said trend of elevated temperatures.

9. The apparatus of claim 8, wherein the controller is configured to power down the remaining storage devices in the array during the severing of the operational connection.

10. The apparatus of claim 8, wherein the controller is configured to execute a self-reboot operation of the controller to sever the operational connection while maintaining the remaining storage devices in an operational condition.

11. The apparatus of claim 8, wherein the controller is further configured to maintain said operational connection when the selected storage device reaches the first temperature threshold level and a temperature profile of the remaining devices in said plurality of storage devices does not demonstrate a trend of elevated temperatures while the selected storage device is at a lower, second temperature threshold level.

12. The apparatus of claim 8, wherein the controller comprises a temperature control circuit which receives temperature values from each of the plurality of storage devices, the temperature control circuit polling the remaining storage devices responsive to the selected storage device reaching the second temperature threshold level.

13. The method of claim 8, wherein an overall difference in temperature between the first temperature threshold level and the second temperature threshold level constitutes a first temperature interval.

14. The method of claim 13, wherein the first temperature interval is at least equal to five degrees Celsius.

15. The apparatus of claim 8, wherein the controller severs the operational connection by shutting down all of the storage devices responsive to being armed, and wherein the controller shuts down the selected storage device while maintaining the remaining storage devices in a powered up condition responsive to being unarmed.

16. A method comprising:
   storing data in a RAID configuration across storage devices of a multi-device array (MDA) while monitoring individual temperatures of said storage devices in relation to a first, lower temperature threshold and a second, higher temperature threshold;
   detecting a presence or an absence of a global trend of elevated temperatures in the remaining storage devices when a selected storage device reaches the first threshold;
   arming a controller of the MDA for a shutdown sequence if said global trend of elevated temperatures is determined to be present during the measuring step;
   maintaining the controller in an unarmed state if said global trend of elevated temperatures is determined to be absent during the measuring step;
   severing an operational connection between the MDA and a host device when the selected device reaches the second threshold and the controller was armed; and
   powering down the selected device while maintaining said operational connection when the selected device reaches the second threshold and the controller remained unarmed.

17. The method of claim 16, wherein the storing, detecting, arming, maintaining, severing and powering down steps are carried out by said controller responsive to programming steps stored in a memory location.

18. The method of claim 16, wherein the severing step comprises concurrently powering down all of the storage devices.

19. The method of claim 16, wherein the severing step comprises continuously maintaining the remaining storage devices in a powered up condition and resetting the controller.

* * * * *